Figure 4:
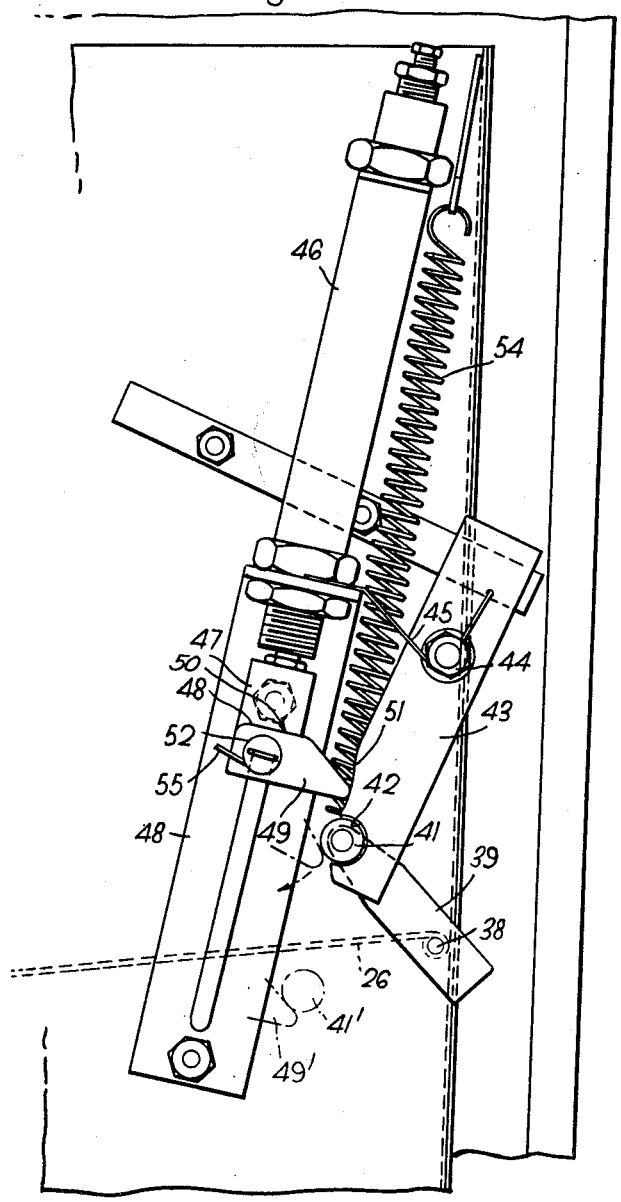

July 21, 1964   N. S. VALENTINE   3,141,705
CONVEYOR SYSTEMS
Filed May 9, 1961   9 Sheets-Sheet 1
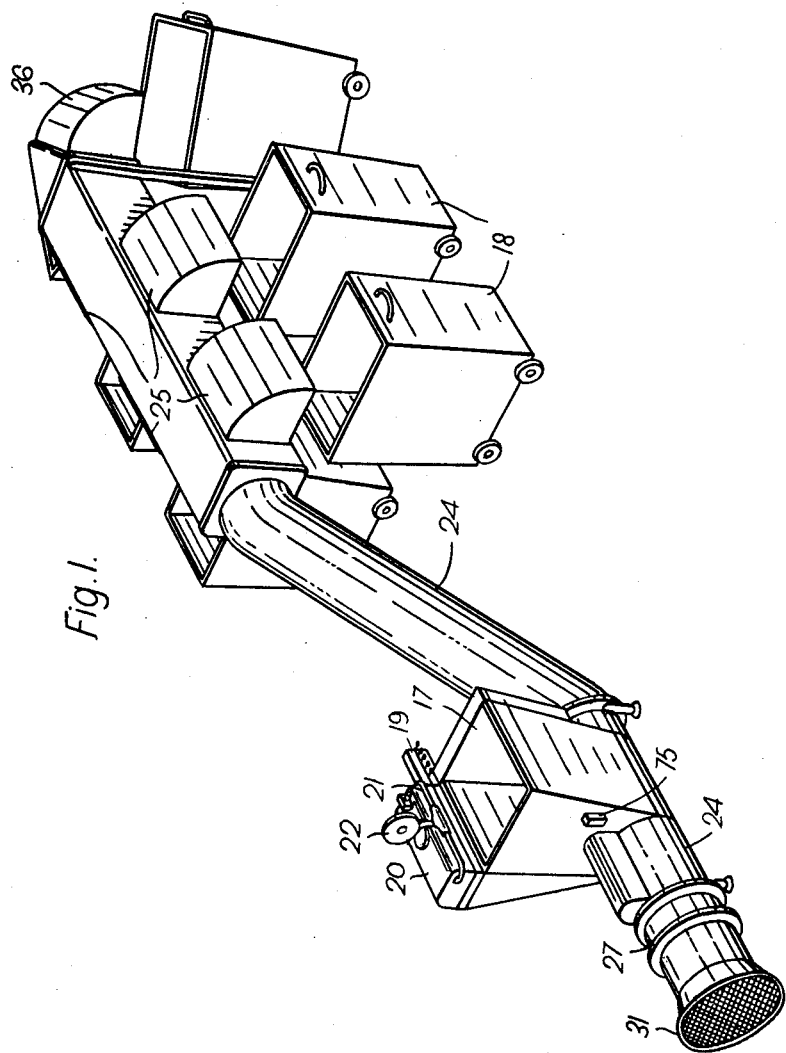

July 21, 1964   N. S. VALENTINE   3,141,705
CONVEYOR SYSTEMS
Filed May 9, 1961   9 Sheets-Sheet 2
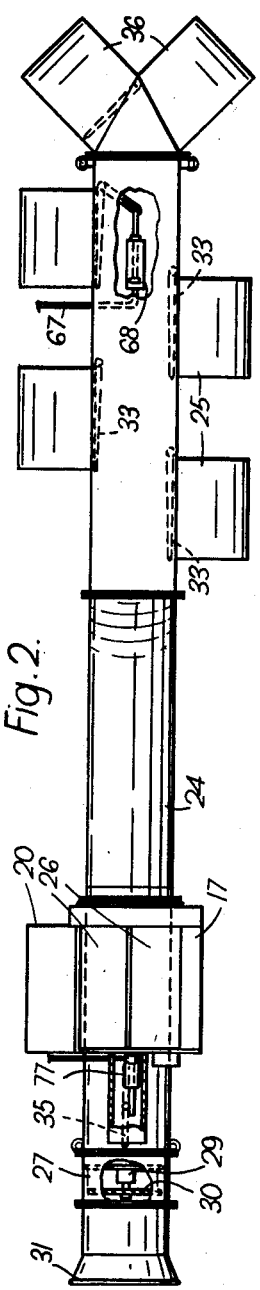
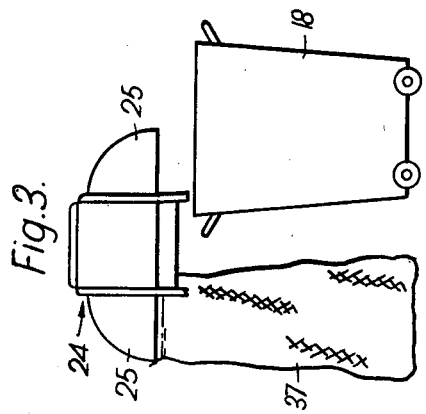
Inventor
Norman S. Valentine
By Watson, Cole, Grindle & Watson
Attorneys

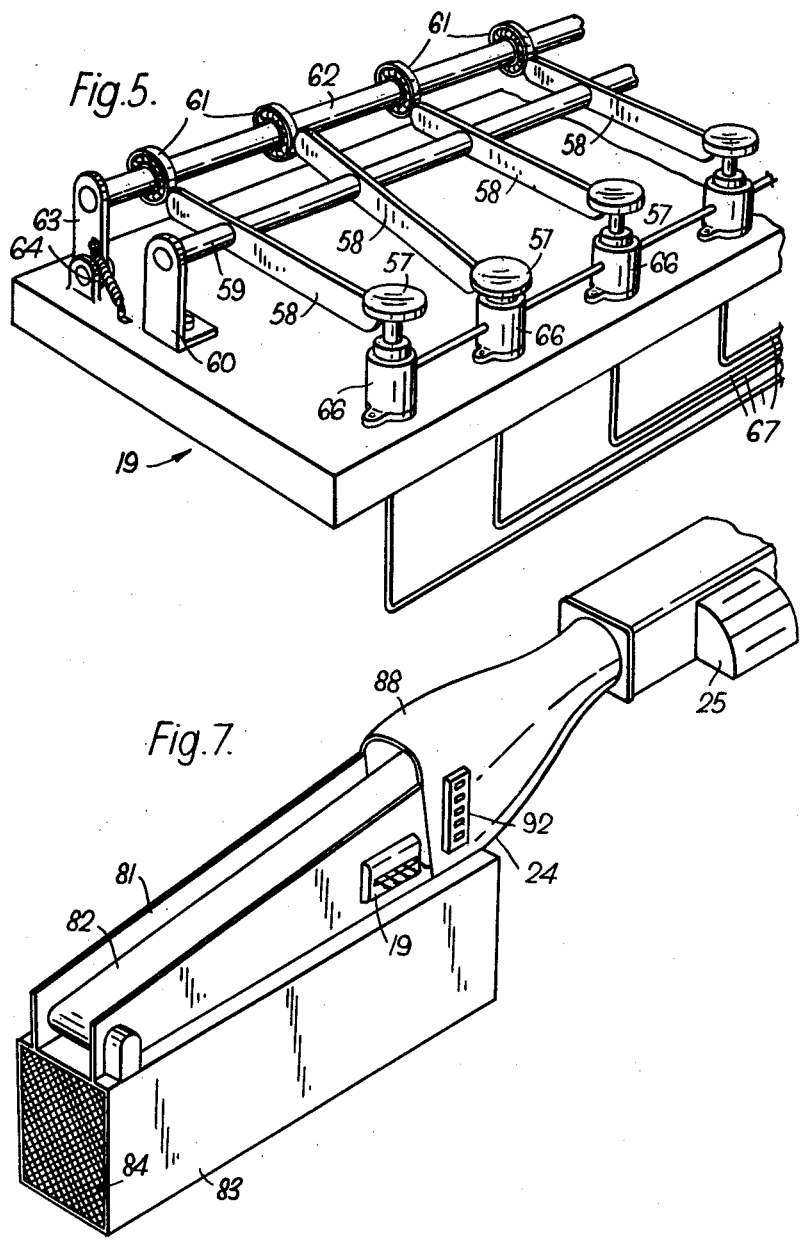

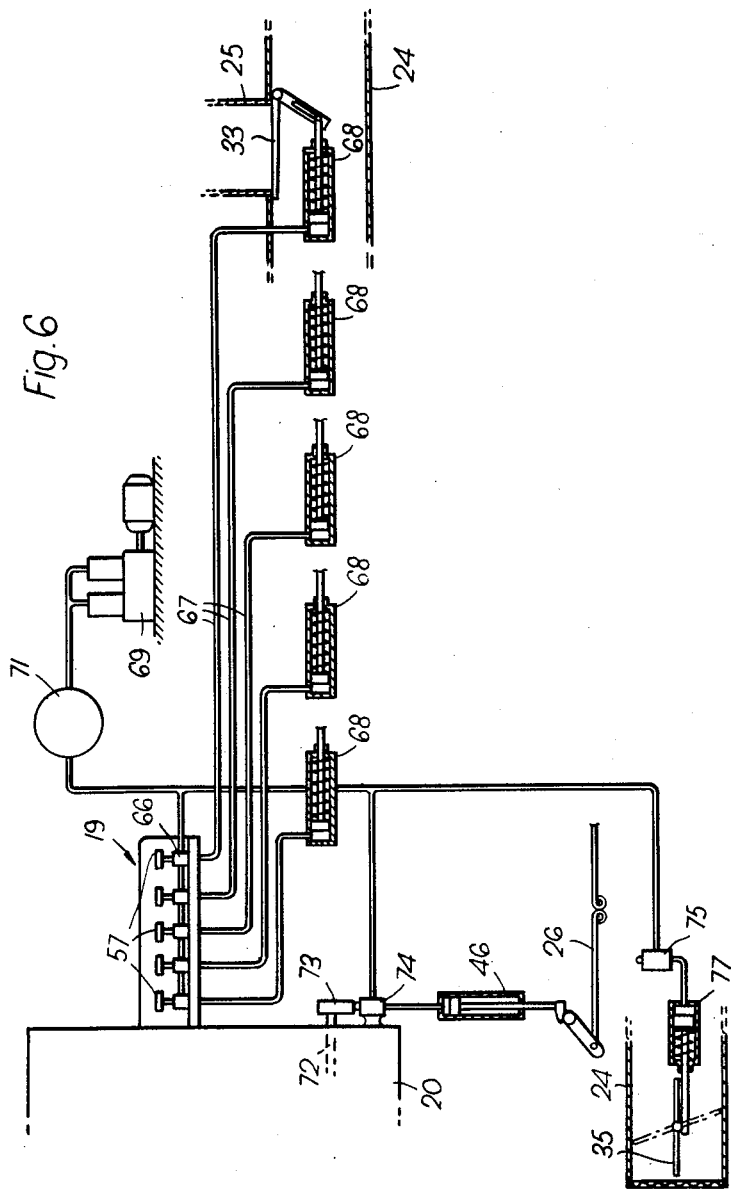

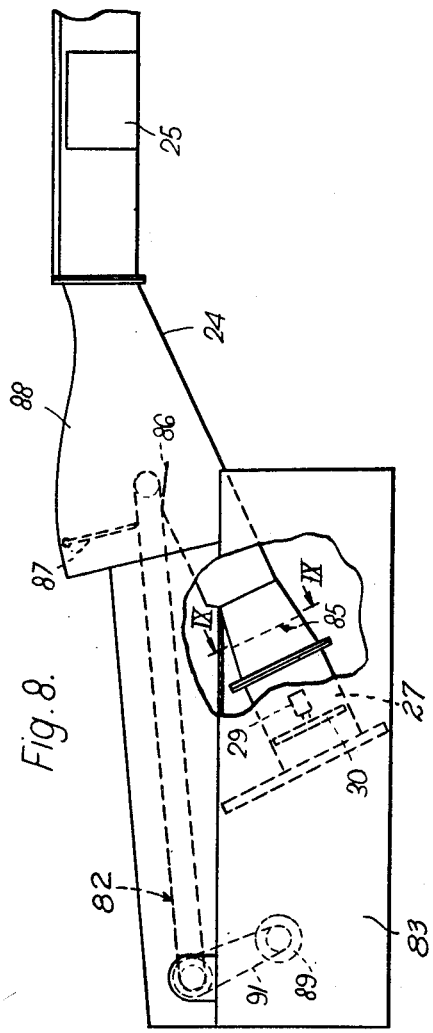
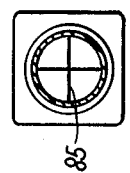

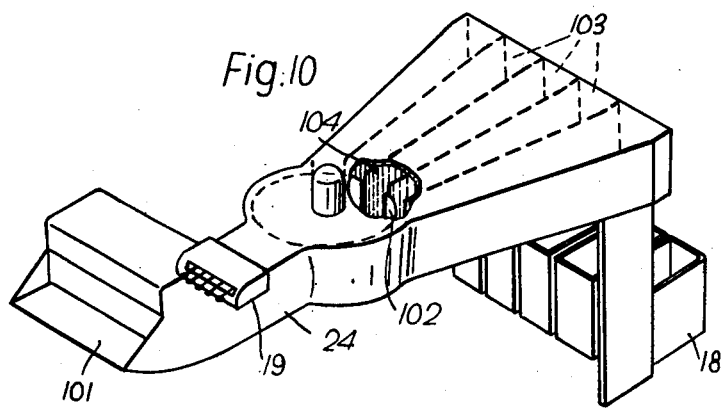
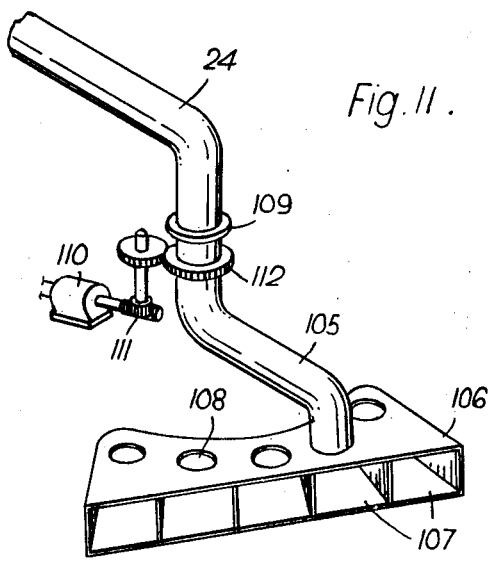

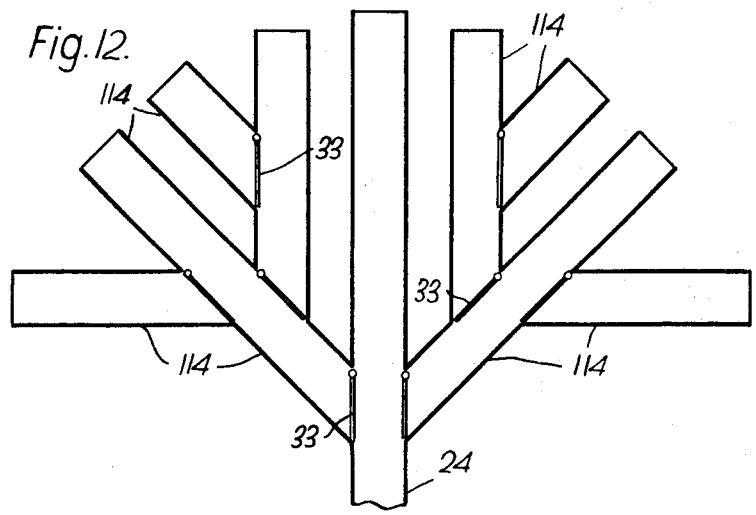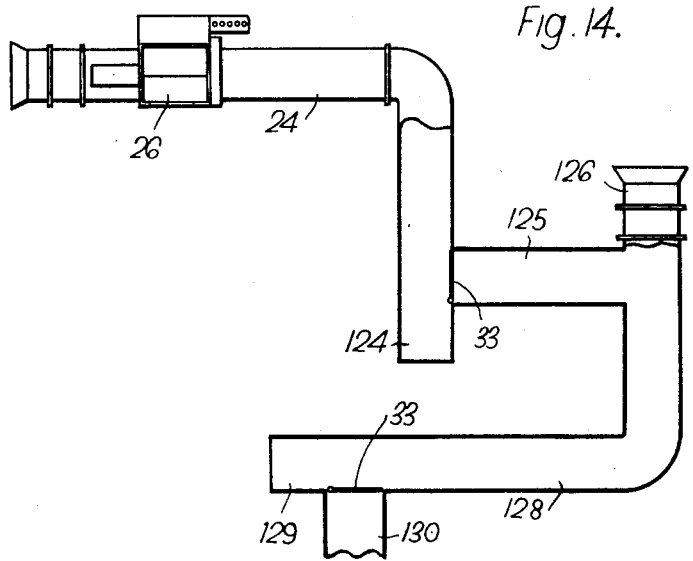

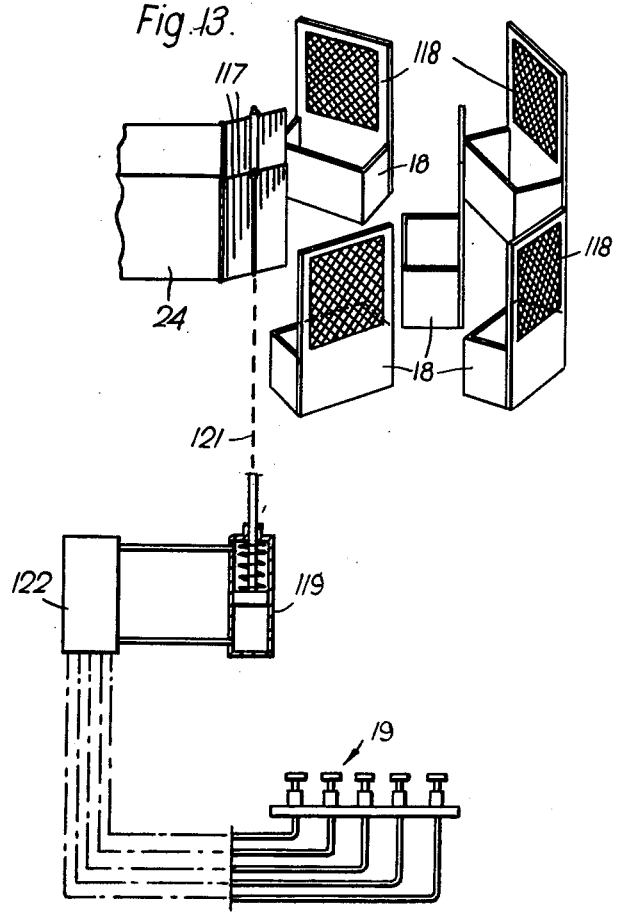

United States Patent Office 3,141,705
Patented July 21, 1964

3,141,705
CONVEYOR SYSTEMS
Norman S. Valentine, Lancing, England, assignor to
Polymark Limited
Filed May 9, 1961, Ser. No. 108,888
12 Claims. (Cl. 302—28)

The present invention relates to improvements in conveyor systems, particularly for handling articles of clothing and other textile articles in laundries, dry-cleaning establishments and the like.

The conveyance of articles in laundries and like establishments involves a rather specialised problem in that a wide range of types and sizes of relatively bulky articles are involved and since various articles may have to receive different treatments it must be possible to convey such articles to different points. Further it is rarely convenient or possible to provide a straight-line path for conveyance of the articles. For these reasons normal types of mechanical conveyor are not adaptable to laundry use and would not in any event be satisfactory because of the high maintenance costs that are involved, aggravated by the unfavourable atmospheric conditions prevailing in laundries and the fact that mechanical conveyance cannot readily be designed to convey articles in a non-linear path nor for delivering articles into any of a selected number of paths.

The present invention has for its object to provide a conveyance system which avoids these defects, permits articles to be delivered if necessary over a relatively circuitous path and permits such articles to be delivered at any preselected point.

In broad terms the present invention is based on the use of a pneumatic conveyor for handling articles of the character specified, and in this connection it should be noted that pneumatic conveyors have been utilised heretofore for conveying powders or fibrous materials, for conveying in bulk large numbers of identical articles, or for despatching containers for small articles as in the pneumatic despatch system for handling cash sales, but it has not been realised heretofore that by employing ducts of comparatively large size it is possible to handle the types of article handled in laundries and like establishments and to convey them individually to selected delivery points.

In accordance with the present invention there is provided a conveyor for distributing articles of clothing or other textile articles to any of several delivery points, wherein a duct is provided in which a conveying air current is maintained by a suitable air flow source, into which duct the articles to be conveyed are separately introduced, and said duct comprises a number of branches each controlled by a selectively movable valve member which determines the path of the air current and the delivery point for each article, the movement of said valve members being selectively controlled by an operator's keyboard.

Said duct may comprise a plurality of branched outlets, each covered by a pivotally movable flap valve adapted to be displaced by a power control device from its position covering said outlet to an alternative position where it substantially obstructs the duct on the downstream side of said outlet to deflect the air current and the article borne thereby to the selected outlet.

In one form of the invention the articles are received by hopper-like member closed at the base by trap doors adapted to open momentarily to admit articles successively into the duct which extends across the base of the hopper.

The conveyor may be operatively coupled with a laundry marking machine adapted to apply a heat-sealable marking tab to each article in succession before conveyance or introduction into the air stream, said marking machine operating means to initiate opening of the trap-door on completion of marking of the article, which is then released into the hopper and introduced into the conveyance air stream.

In another form of the invention a conveyor belt member forms the base of a receiving tray and the air current source is located beneath said conveyor belt, the air being delivered into an inclined rising duct into which the articles are introduced by the conveyor belt, the entering articles being adapted to displace a pivotally movable door as each article is introduced into the air stream.

In this case a keyboard placed adjacent the point at which articles are introduced into the conveyor stream is adapted to control the selective delivery of the articles at the different delivery points, and said keyboard may also control electric switches for operating counters recording the number of articles of each denomination handled by the conveyor.

In an alternative arrangement the duct is divided successively into a series of branches branching one off the other, each branch being controlled by a pivotally movable valve selectively movable in groups to secure delivery to a required delivery point.

Selective delivery of articles may also be performed by means of a pair of parallel pivotally movable baffles at the end of the duct, the selective positioning of said baffles controlling the direction of ejection of the articles towards any of a plurality of containers each associated with a screen adapted to intercept the articles and allow them to fall into the respective selected container.

Several embodiments of the present invention are shown by way of example on the accompanying drawings in which:

FIG. 1 is a general view in perspective showing a classifying conveyor according to the present invention, FIG. 2 is a plan view illustrating the embodiment of FIG. 1, FIG. 3 is a diagrammatic end view showing alternative arrangements for receiving conveyed articles, FIG. 4 is a detail view illustrating the trap operating mechanism for the receiving hopper, FIG. 5 is a detail view of a control keyboard, applicable to all embodiments of the present invention, FIG. 6 is a circuit diagram applicable to embodiment of FIGS. 1 to 3 showing the pneumatic pipeways, control valves and operating cylinders and the manner of their operation in conjunction with a laundry marking machine, FIG. 7 is a general view illustrating another embodiment of the invention, FIG. 8 is a longitudinal section showing part of the embodiment of FIG. 6, FIG. 9 is a cross-sectional view on the line IX—IX of FIG. 7, and FIGS. 10, 11, 12, 13 and 14 are diagrammatic views illustrating further embodiments of the invention.

Referring in the first place to the embodiment shown in FIGS. 1 to 3 of the accompanying drawings, it will be understood that broadly the equipment is concerned with means for conveying articles of clothing or other textile articles being handled in a laundry. The articles are received by a hopper 17 for transmission selectively to any of a plurality of receiving containers 18 as selected by the keys of a keyboard mechanism 19. Conveniently, and as shown on FIG. 1 of the drawing, the hopper 17 is arranged in front of a laundry marking machine 20, which may conveniently be a machine adapted to attach a printed heat-sealable label by heat and pressure to the garment or other article to be marked, supported on a buck 21 pivotally mounted at the front of the marking machine. During the marking operation the article is supported on the buck 21 in a substantially vertical pressing position where heat and pressure are applied to the tab to fix it to the article. The tab is cut from a continuous roll of tape 22 on the marking apparatus.

On completion of the marking operation the buck 21 moves to an inclined position and the article being marked then drops into the hopper 17, from which it is introduced into an air current. Extending across the base of the hopper 17 is an air duct 24 in which a current of air is maintained which conveys the article along the duct 24 to distribution or delivery branches 25 positioned above containers 18. The articles are selectively delivered into the containers according to the operation of the keyboard 19.

Referring now to the apparatus in more detail and particularly with reference to FIG. 2, it will be seen that the hopper 17 is closed at the base by hinged trap doors 26 adapted when opened to allow the aricles to fall into the air current in the duct 24. This air current may be a suction-induced current or alternatively a duct section 27 extending on the opposite side of the hopper 17 to the duct 24 may include an electric motor 29 and fan 30 adapted to draw air from an intake 31 and deliver it as a current into the duct 24.

The duct 24 may follow any desired path to a delivery point which need not be arranged near to the receiving hopper 17 in the manner specifically suggested in FIG. 1, since the equipment concerned may incorporate a comparatively long duct 24 between the hopper 17 and the delivery branches 25 and the receiving containers 18. These parts need not be arranged in line since the ductway 24 can follow a curved path to the delivery points without serious loss of conveying power.

Arranged at each delivery branch 25 on the downstream side of the outlet is a pivotally movable flap member 33 adapted to be moved from a position either closing an outlet leading to the respective delivery branch 25 or being movable to an alternative position where the air current, and consequently any articles conveyed by said air current, is delivered through the said branch 25.

Means described hereinafter with reference to FIG. 4 are provided for opening the trap-doors 26 at the same time as the marking machine 20 releases the articles after marking, and means are further provided whereby a butterfly control valve 35 between the fan unit 29, 30 and the hopper 17 is closed when the trap-doors 26 are opened; the purpose of this is to prevent the air current being deflected upwardly towards an operator working over or near the hopper 17. The valve 35 opens immediately the trap-doors 26 are shut so that each successive article after marking is delivered into the air stream and fed to the delivery branch 25 selected by the keyboard 19.

The delivery branches 25 may be arranged in any convenient manner. They could, if desired, be arranged on the lower face of the duct 24 but conveniently, as shown, they are arranged on both side faces in staggered order and they are of hooded form to deliver the articles downwardly. The end of the conveyor duct 24 may embody a V-branch 36 which may deliver either into further conveying ducts or the two branch arms may form other delivery branches 25.

The invention is not limited to the delivery of articles into containers 18 as it is also possible for sack-like containers 37, conveniently of openwork (stringbag) structure, to be attached to the under faces of the delivery branch hoods 25, as illustrated in FIG. 3. This procedure is often useful in laundry practice since articles can be delivered directly into such containers, which can then be handled as a unit.

Referring now to FIG. 4 this shows the operating mechanism for the trap doors 26. These comprise opposed trap doors with a central division, between them, each opening down to allow an article to fall into the duct 24.

Each door section 26 is supported by a spindle 38 extending to outside of the hopper casing and carrying at this point a projecting arm 39 having a roller 41 at its free end. This roller is adapted to be engaged by a deep depression 42 in a lever 43 pivoted at 44 and controlled by a torsion spring 45 to maintain the depression 42 in engagement with the roller 41 to hold the trap-doors 26 in their approximately horizontal closed position.

A pneumatic operating cylinder 46 includes a piston connected to a piston rod, the free end of which embodies a carrier 47 guided in a slideway 48 and carrying a pivoted latch plate 49 adapted to engage a curved face portion 51 of the lever 43 and also the roller 41. The latch plate 49 is pivoted at 52 to the carrier 47 and is controlled by a torsion spring 55 so that it can move freely anti-clockwise from the position shown in FIG. 4, being held by spring 55 against a stop face 50 of the carrier 47.

On admission of air to the cylinder 46 the carrier 47 and latch plate 49 move downwardly and the latter engages the roller 41, disengaging it from the depression 42 to rock the lever 39 and move the trap-doors 26 in the anti-clockwise direction to open the trap-doors momentarily. Towards the end of the downward movement of the piston the roller 41 rides off the end of the latch plate 49, as illustrated in dotted lines at 41', 49' so that the trap-doors are immediately raised by the action of springs 54, the rollers 41 again re-engaging the depresssions 42 towards the end of the upward movement of the trap-doors. The result of these actions is that the trap-doors open momentarily to allow the article to drop into the air current and then the trap-doors 26 immediately close irrespective of the operation of the air cylinder 46. At the commencement of the next marking operation the pressure is released from the cylinder 46 so that the carrier 47 and the latch plate 49 return to the starting position shown, the latch plate swinging freely anti-clockwise as it passes the roller 41 without displacing said roller, and subsequently returning to the starting position shown.

The keyboard 19 for selectively controlling the flaps 33 is illustrated on FIG. 5. Provision is made to ensure that on depression of any specific key any previously depressed key is returned to the starting position. As shown in FIG. 5 a number of keys 57 are carried by levers 58 pivoted on a common spindle 59 supported by a bracket 60 and the ends of the levers 58 are curved for co-operative engagement with a plurality of rollers 61 carried by a spindle 62 supported by a lever 63 subjected to the action of a spring 64. It will be seen that on depression of any particular key the curved cam end part of the lever 58 concerned displaces the respective roller 61 and the spindle 62, thus releasing any other key, as it moves to its operated position and the roller 61 concerned then serves to maintain the depressed key 57 in the down position, as shown in the case of the second key 57 on the drawing.

Each key 57 co-operates with an air valve 66 linked by a feed pipe 67 to an air cylinder, as shown for example at 68 on FIG. 2, for operating the respective flap 33. The flap 33 is associated with a spring tending to return it to the position shown on FIG. 2, admission of air to the respective pipe 67 displacing the piston of the cylinder 68 to move the flap 33 to its alternative position on depression of the respective key 57.

A circuit diagram illustrating these features is shown in FIG. 6 where an air compressor 69 and an air storage tank 71 feed all the control valves 66 of the keyboard 19, these valves admitting compressed air according to which key 57 is depressed, through lines 67 to the operating cylinders 68, four of which are shown by way of example, these cylinders being linked to the respective flap valve members 33.

As shown in FIG. 6 a laundry marking machine 20 embodies a main operating shaft 72 which carries a cam 73 operating a further air control valve 74 which, on completion of the operating cycle of the marking machine 20, admits air to the cylinders 46 operating the trap doors 26. A further air valve 75, the position of which is also marked on FIG. 1 of the drawings, is operated by one of the trap-doors 26 so that on downward movement of said trap-door compressed air is also admitted to an air cylinder 77 operating the butterfly valve 35, said air cylinder being also shown on FIG. 2 of the drawings.

The method of operation is as follows:

As the operator standing in front of the hopper 17 places an article on the buck 21 of the marking machine 20 and moves the buck away from her to the vertical position, the marking machine comes into operation to apply a marking tab to the article. Immediately the machine operation commences the cam 73 releases pressure from the valve 74 and consequently the pistons of cylinders 46 return to the starting position shown on FIG. 4. As already explained this has no effect on the trap-doors 26 which are already closed. At the same time the operator decides from the nature of the article what classification is to be adopted and depresses the appropriate key 57. This admits air to the appropriate operating cylinder 68 and operates the flap valve 33 concerned.

On completion of the marking operation main shaft 72 stops and the buck 21 moves forwardly and allows the article to drop into the hopper 17. At the same time the cam 73 has returned to its normal position and the valve 74 is opened to admit compressed air to the cylinders 46 which momentarily open the trap-doors 26 to allow the article to drop into the air current in the duct 24. Immediately thereafter and as already explained, the trap-doors 26 return to their closed position. As the trap-doors 26 open the butterfly valve 35 is closed to prevent too much air passing upwardly through the hopper 17 and inconveniencing the operator working at that point. On closure of the trap-doors, however, the valve 35 is again opened and air flows into the duct 24 to convey the aricle through the duct and deliver it at the point selected by operation of the keyboard 57.

FIGS. 7 to 9 illustrate a section of an alternative form of equipment according to the present invention which is particularly designed for handling articles in bulk, i.e. where considerable numbers of articles of each denomination are involved, as in the case of contract work in a laundry. In this case it is not necessary for each article to be marked, as for example by the marking machine indicated at 20 on FIG. 1 of the drawings.

Referring in the first place to FIG. 7, it will be seen that a receiving tray 81 is provided for the articles to be conveyed, the base of the tray being formed by a conveyor belt 82, these parts being supported on a floor stand 83 the front of which forms a screened inlet 84 for air passing towards the fan equipment shown on FIG. 8 of the drawings. Articles placed successively on the conveyor belt 82 are fed towards a feeder duct 24 for the articles where they encounter a door 87 movable about a horizontal axis at the top, being moved aside by the articles entering the duct for conveyance to delivery points selected by the keyboard 19.

As shown in greater detail in FIG. 8, the floor stand 83 houses an intake duct section 27 including a motor and fan unit 29, 30 which produce an air current which enters obliquely into the main feed duct 24. The articles are introduced into the duct 24 by the action of the conveyor belt 82. A suitably positioned guide plate 86 beyond the door 87 controls the air flow from the motor-fan unit 29, 30 so that the air flow is directed mainly into the duct 24 for conveying the articles with minimum blow back of air towards the conveyor belt 82. It will be observed that the movable door 87 serves to prevent loss of air due to any blow back there may be as an article enters the main conveyance duct and as it comes into engagement with the full force of the air stream produced by the motor-fan unit 29, 30. It is preferred to provide between the motor-fan unit 29, 30 and the main conveyance duct a casing 88 containing an air flow guide member 85 formed by two mutually crossing plates disposed within the casing 88 and which have the purpose of avoiding air turbulence at the point where the main air current enters the conveyance duct.

A number of operation counters 92 are provided on the side wall of the main casing of the apparatus, these counters being selected by operation of the keyboard 19 which also controls the delivery flaps 33 as already explained in conjunction with FIGS. 1 to 6. In this connection it will be understood that the receiving equipment shown on FIG. 7 may be associated with a delivery duct with a plurality of delivery points which may be for example arranged as described in conjunction with FIG. 1.

The operation of this equipment is as follows:

As the first article of each denomination is placed on the conveyor belt 82 one of the keys 57 of the keyboard 19 is depressed according to the nature of the particular article being received to operate one of the flaps 33. That key will remain depressed as long as similar articles are being handled. The depression of that key will also operate one of the switches 93 with the result that on every closure of the switch 94 as the door 87 is moved by an entering article, the respective counter 92 is advanced by one unit. When an article of a different denomination is handled a different key 57 is depressed, this releasing any previously depressed key as already explained and bringing the respective counter 92 into operation. Apart from the provision of the additional switches 93 the keyboard 19 utilised in conjunction with the FIG. 7 construction is similar to that described and shown on FIG. 5.

It will, of course, be understood that the dimensions of the duct 24 are sufficient to accommodate the types of article encountered in laundry practice, and it has been found that satisfactory results are secured if the duct is about 50 to 60 cm. diameter or, in the case of a square duct, each side is about 50 to 60 cm. wide. Conveyance can satisfactorily be performed in many cases with a single fan unit 29, 30 but for conveyance over long paths additional booster fan units may be provided, which in some circumstances may be placed in an obliquely positioned branch so as to produce a second air stream converging upon and merging with the main air stream. Another arrangement embodying the use of further fan units is described later in conjunction with FIG. 14.

The operation of the flap valve members 33 controlling the selective delivery of articles through the various delivery branches may also be performed by electric or hydraulic control means. Pneumatic operation is, however, convenient, firstly because compressed air is commonly available in the plant to which the conveyor is applied, and secondly because the delay in operation to relatively remote control flaps 33 is of no importance because the arrival of the article at said flap member is delayed to about the same extent.

FIGS. 10 to 14 of the accompanying drawings illustrate in outline form various modifications of the present invention. As shown in FIG. 10 articles to be conveyed and selectively classified are received in a hopper 101 opening into a horizontal duct in which a conveyance air stream is produced by the means already described herein. The duct, which may be comparatively long, or quite short, as shown in the drawings, leads to a distributor in the form of a rotary cylinder 102 within a circular casing, said cylinder having a feed aperture adapted to be selectively positioned adjacent any of a number of ductways formed in a delivery box 103 by dividing vanes 104 therein so that, according to the rotary position of the cylinder valve 102, articles may be delivered into one or other ductway for delivery to suitable containers. Where the valve 102 is placed close to the hopper 101 the valve 102 may have an operating lever for operation by an attendant feeding articles to the hopper 101. Alternatively, however, particularly where the valve 102 is remote from the hopper 101, a keyboard 19 may be provided operating the valve 102 through a suitable remote control.

FIG. 11 illustrates an alternative multiple distribution point for a conveyor system, where the duct 24 has a downwardly directed pivotally movable cranked delivery pipe 105 adapted to be swung selectively over a distribution box 106 having a plurality of outlets 107 for different classes of articles. The outlet orifice of the pipe 105 is engageable with any of a series of apertures 108 so that articles conveyed by the duct 24 can be distributed of said outlets. A rotary joint 109 and a suitable stuffing box is provided to allow for movement of the pipe 105 and movement of the pipe 105 is selectively controlled manually or by an adjuster motor 110 operating through gears 111, 112.

In FIGS. 1 to 9 of the drawings it has been assumed that a duct 24 is provided with a plurality of branch distribution points or branches any of which can be selected by operating one of the flap valves 33.

FIG. 12 illustrates an alternative arrangement wherein the duct 24 is divided at successive points to form a series of branch ducts 114 branching successively one from the other and each controlled by a flap valve 33 so that the path to any selected outlet involves the displacement of a plurality of flap valves, but the total number of valves provided is less than the total number of outlets. In this case the keyboard 19 is arranged to select whichever of the flap valves 33 must be displaced to secure delivery at the required point.

FIG. 13 illustrates another embodiment of the invention where a pair of pivotally movable baffle members 117 linked one to the other are provided at the end of the duct 24. Articles conveyed through the duct 24 are ejected with some considerable force from the end of the duct 24 in a direction controlled by the position of the baffles 117 and are adapted to be collected by containers 18 which may be arranged in concentric rows as indicated. Positioned above each container is a perforated screen 118 which intercepts the articles and allows them to drop into the respective container 18. The position of the baffles 117 is selected by means of any suitable control device for example a hydraulic control 119 controlled by a suitable control unit 122 from a keyboard at the receiving point, for example the keyboard 19 as shown on FIGS. 1 to 10. The hydraulic control 119 is linked to the baffles 117 by means of a connecting rod 121.

FIG. 14 illustrates an embodiment of the invention where delivery of articles may be required at widely different points of a laundry plant, for example for direct delivery to different washing machines, rather than for delivery to containers 18 or to sack-like elements 37. In this case the duct 24 may follow a somewhat circuitous path as called for the laundry lay-out, as suggestively indicated on the drawings, and may for example include a first outlet 124 controlled by a suitable flap valve and may be continued by a pipe 125. All the valve flaps are controlled by a keyboard 19 as before. A booster fan 126 may be provided on a branch at right angles to the pipe 125 and may be continued by other pipes 127, 128, 130 with suitable outlets 129 wherever required.

What is claimed is:
1. A conveyor for distributing textile articles comprising a duct having a cross section sufficient for airborne conveyance of such articles, means to produce a conveying air current in said duct, means to introduce the articles to be conveyed singly into said duct, said latter means including an article feeder and a pivoted door member movable to admit the articles into the air current in said duct and movable in the opposite direction after passage of each article to close said duct from said article feeder, a selectively movable valve member for controlling the path of the air current and the delivery point for each article, and selective control means for said valve member including an operator's keyboard.

2. A conveyor according to claim 1, wherein the selectively movable valve member comprises a movable pipe section.

3. A conveyor as claimed in claim 1 wherein said duct comprises a plurality of branch outlets, each covered by a pivotally movable flap valve adapted to be displaced by a power control device from a position covering said outlet to an alternative position where it substantially obstructs the duct on the downstream side of said outlet to deflect the air current and the article borne thereby to the selected outlet.

4. A conveyor as claimed in claim 1 wherein an air flow source consists of a fan motor unit disposed on the upstream side of the point of the duct where articles to be conveyed are introduced singly into the duct.

5. A conveyor according to claim 4 wherein said pivoted door member is adapted to be opened by a compressed air cylinder unit displacing a pivoted latch which engages a roller operatively linked to said pivoted door member, said roller being carried by an arm which towards the end of the opening movement of the pivoted door member moves out of the path of the latch to allow the pivoted door member to close under the action of a spring.

6. A conveyor as claimed in claim 4 wherein a pivotally movable butterfly valve is provided in the duct on the upstream side of the base of the hopper to cut off the supply of conveyance air as the said pivoted door member opens momentarily to admit an article into the duct, said butterfly valve being closed by means of an air cylinder brought into operation by movement of the said pivoted door member.

7. A conveyor as claimed in claim 1 wherein the articles are received by means of a conveyor belt which introduces them approximately in the horizontal direction into the conveyance air stream.

8. A conveyor according to claim 7 wherein said conveyor belt member forms the base of a receiving tray and the air current source is located beneath said conveyor belt, the air being delivered into an inclined rising duct into which the articles are introduced by the conveyor belt, the entering articles being adapted to displace said pivoted door member as each article is introduced into the air stream.

9. A conveyor according to claim 1 wherein said keyboard is arranged so that the depression of any specific key releases any previously depressed key and that each key is adapted to operate an air valve to control the admission of air to a series of control cylinders operating the said valve members for selective delivery of the articles.

10. A conveyor according to claim 1 wherein the selectively movable valve member comprises a rotary valve.

11. A conveyor according to claim 1 wherein the duct is divided successively into a series of branches branching one off the other, each branch being controlled by a pivotally movable valve, which valves are selectively movable in groups to secure delivery to a required delivery point.

12. A conveyor according to claim 1 wherein selectively movable valve member comprises a pair of parallel pivotally movable baffles at the end of the duct, the selective positioning of said baffles controlling the direction of ejection of the articles towards any of a plurality of containers each associated with a screen adapted to intercept the articles and allow them to fall into the respective selected container.

References Cited in the file of this patent
UNITED STATES PATENTS
1,941,190    Schneider              Dec. 26, 1933

FOREIGN PATENTS
617,985    Germany               Aug. 30, 1935